United States Patent [19]

Fesmire

[11] 4,407,220

[45] Oct. 4, 1983

[54] CEMENT SPRAYING MACHINE FOR TIRES

[76] Inventor: Lloyd W. Fesmire, 580 W. Church St., Lexington, Tenn. 38351

[21] Appl. No.: 264,184

[22] Filed: May 14, 1981

[51] Int. Cl.³ .................... B05B 1/28; B05B 13/00; B05C 13/02
[52] U.S. Cl. ................................ 118/64; 118/66; 118/320; 118/326; 156/96; 156/394.1
[58] Field of Search .................. 156/95–96, 156/394 R, 394 FM, 394.1; 118/64, 66, 320–322, 326

[56] References Cited

U.S. PATENT DOCUMENTS

| | | | |
|---|---|---|---|
| 1,850,238 | 3/1932 | Maynard | 118/320 |
| 1,876,967 | 9/1932 | Krause et al. | 118/320 |
| 2,690,207 | 9/1954 | Godfrey | 118/241 |
| 2,758,037 | 8/1956 | Cahill | 118/321 |
| 2,799,243 | 7/1957 | Harb | 118/320 |
| 3,568,638 | 3/1971 | Isaac | 118/326 |
| 3,832,972 | 9/1974 | Pace | 118/326 |
| 4,234,370 | 11/1980 | McDonough et al. | 156/96 |
| 4,306,826 | 12/1981 | Detwiler | 118/320 |

Primary Examiner—Edward C. Kimlin
Assistant Examiner—Lois E. Boland
Attorney, Agent, or Firm—Harvey B. Jacobson

[57] ABSTRACT

A machine for applying a layer of cement along the outer circumference of a tire for the purposes of retreading the tire, the machine comprises an air blower for removing dust adhered to the tire after the buffing process, a tire cart carrier which automatically raises the tire into spraying position and a spray head which applies a layer of cement on the outer circumference of the tire as the tire is rotated upon the tire cart carrier. The cement spraying machine is enclosed within a vent hood which is associated with a blower to vent all fumes from the spraying area. The tire cart carrier comprises a rotating support structure for contacting the upper bead of the tire and a weighted centering beam which contacts the lower bead of the tire as the tire cart carrier is raised into spraying position. The centering beam centers the rotating tire on the rotating support structure during spraying.

6 Claims, 7 Drawing Figures

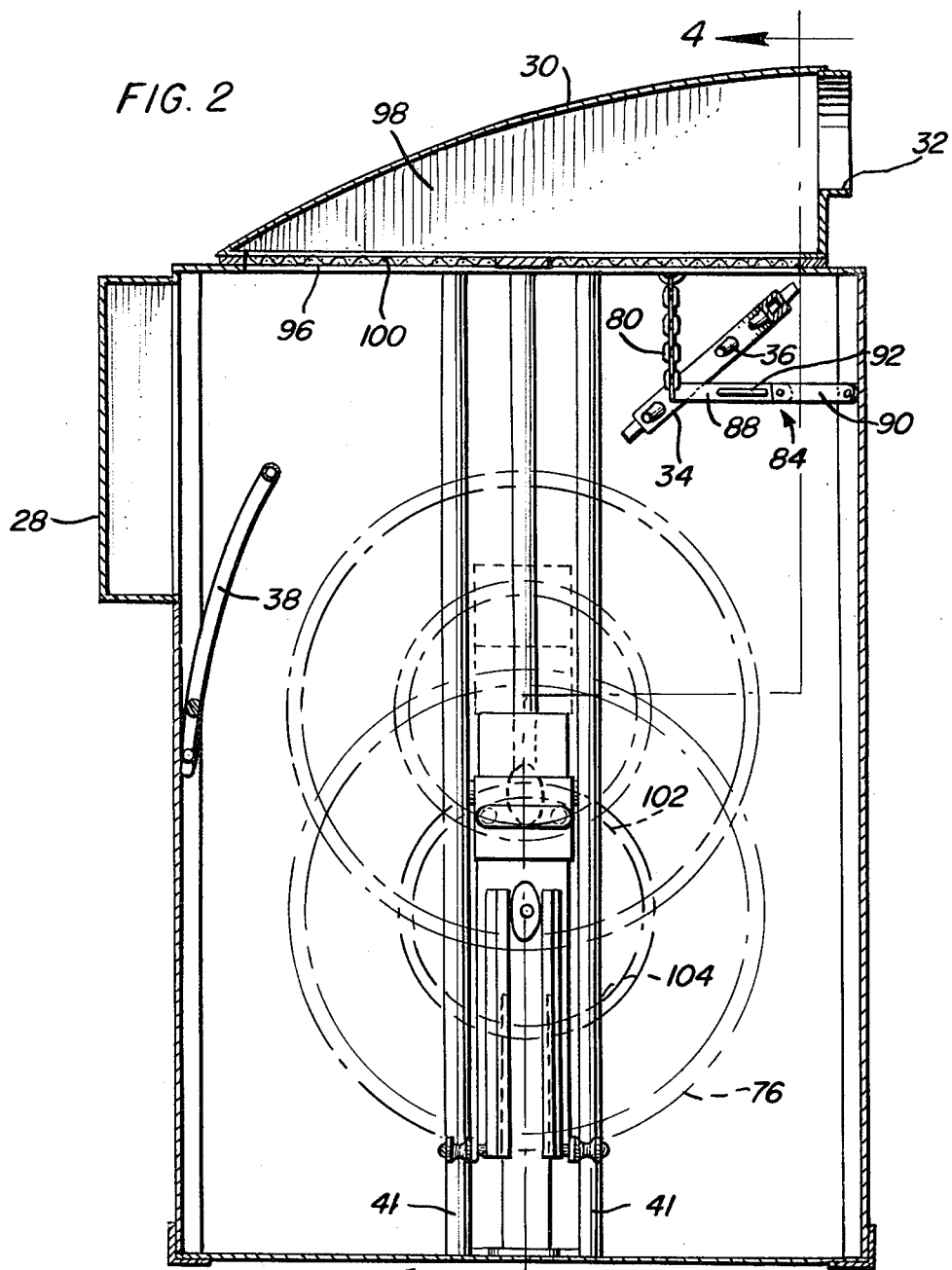
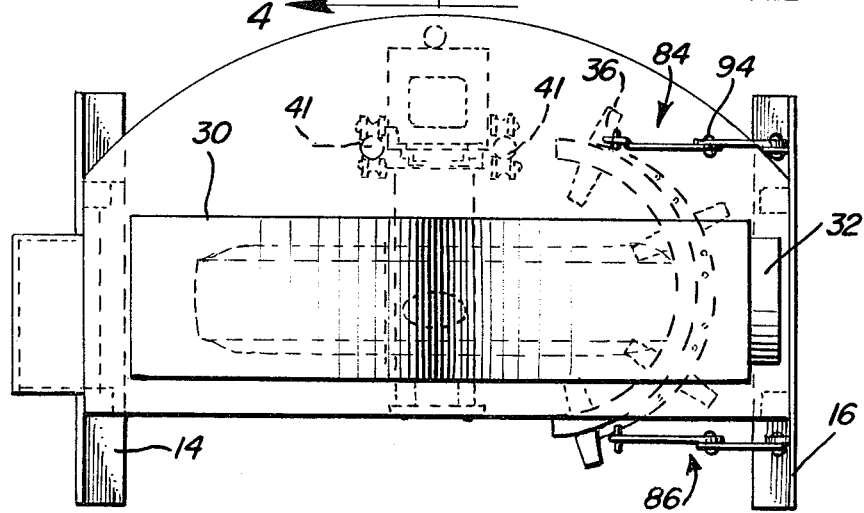

CEMENT SPRAYING MACHINE FOR TIRES

BACKGROUND OF THE INVENTION

1. Field of the Invention

This invention relates to a machine for applying cement coating to rubber tires and, more particularly, the invention is directed to a machine for applying cement to tires during the process of recapping.

The process of recapping worn tires comprises the steps of first removing the worn tread by means of a cutting device and removing any remaining tread with a buffing mechanism which further smooths the crown portion of the tire which receives the recap. A cap of rubber strip material is then cemented in place over the buffed and smooth crown of the tire, and the tire is vulcanized with the cemented cap in place. The present invention relates specifically to a machine for applying the cement which joins the cap to the tire.

Improvements in the recapping operation have previously involved designing cement applying machines which will apply the proper amount of cement to the buffed tire. However, the cement applying step performed with tire recapping machines generally in use is an operation which is inefficient in utilization of time, labor, and material. Furthermore, the operation of such tire recapping machines does not meet the stricter environmental regulations for the health and safety of the individual worker as usually the buffing and cementing steps are performed in the open. Accordingly, while tire recapping machines have been developed which satisfactorily apply the proper amount of cement to the buffed tire, there is still a great need for a cement applying machine in a tire recapping process which can meet the current standards for environmental health and safety and which will be significantly more efficient in the utilization of time and labor.

2. Description of the Prior Art

Prior cement applying devices for coating tires during the tire recapping process have attempted to increase the uniformity of application of the cement onto the crown of the buffed tire. U.S. Pat. No. 2,758,037, issued Aug. 7, 1956, to Cahill, is a typical example of a prior art device which has been designed to apply a thin film of cement uniformly over the cap-receiving surface of the tire supported on a rotating mandrel and yet will result in a great saving of time, material and labor. Typical of the cement applying device similar to the Cahill apparatus is that the application of the cement is done in the open wherein the cement fumes and excess spray fills the workplace area. Further, such devices do not automatically support tires of varying diameter and therefore must be manually adjusted each time that the size changes. U.S. Pat. No. 2,690,207, issued Sept. 28, 1954, to Godfrey, discloses a tire tread cementing machine in which a brush is utilized to supply cement to a rotating tire in which both the upper and lower beads of the tire are supported by moving support means. The tire is further mounted on a frame which can be adjusted so as to allow the various bead contacting means to support tires of varying diameter. However, as in the previously mentioned prior devices, the Godfrey machine cannot automatically adjust for tires of varying sizes and accordingly, manual labor must be utilized to prepare the cementing machine for tires of different sizes. U.S. Pat. No. 1,876,967, issued Sept. 13, 1932, to Krause et al, discloses a machine for painting tires in which the tire is clamped onto a pair of tire arms and rotated thereon, the painting application being accomplished within a casing in which the tire rotates. There is no disclosure in this patent that the casing is provided with a vent to remove excess fumes therefrom, nor is there a disclosure of an automatic means to adjust for tires of varying size. Accordingly, while prior art cement applying machines for tire recapping have successfully been structured so as to provide a uniform layer of cement on the buffed tire surface, such devices pose a significant health and safety hazard for those operating the machines and still require a significant amount of manual labor in order to manipulate the devices in order to accommodate all types of tires and tire sizes.

SUMMARY OF THE INVENTION

It is an object of the present invention to provide an apparatus for applying cement to tires during the process of recapping worn tires which will result in a great saving of time, material and labor in comparison with other apparatus for this purpose.

It is another object of the invention to provide an apparatus which will apply a thin film of cement uniformly over the cap-receiving surface of a buffed tire to provide a strong bond between the cap and the buffed surface of the tire.

It is another object of the invention to provide an apparatus for applying cement to tires during the process of recapping tires in which the apparatus is capable of spraying a uniform thin film of cement on the buffed tire surface and maintain the surrounding work environment free of excess cement, thus meeting current standards of worker health and safety.

It is still another object of the present invention to provide an apparatus for applying cement to buffed tires during the process of recapping in which the apparatus automatically moves the tire into spraying position and adjusts for tires of varying size.

Still yet another object of the present invention is to provide an apparatus for applying cement to a tire during the process of recapping in which the apparatus cleans the buffed tire surface and sprays a uniform layer of cement on the clean, buffed surface of the tire automatically and in which no manual labor is required to adjust the apparatus for treating tires of varying size.

In accordance with these objects, the present invention provides a tire cementing machine useful in the recapping process, the machine comprising a plurality of spray heads positioned on an arcuate support arm for spraying cement under pressure onto the crowned surface of a tire while the tire is slowly rotated and supported for rotation by a pair of rollers contacting the upper bead of the tire and a weighted beam urged against the lower bead of the tire. The cement spraying machine includes an air brush which before spraying commences cleans the rotating tire of loose rubber particles formed during the buffing process. A buffed tire is brought into spraying position adjacent the spray heads by simply placing the tire onto a tire cart carrier which includes the support rollers which contact the upper bead of the tire, and initiating movement of the tire cart carrier upward into the spraying position. As the tire cart carrier supporting the tire on its upper bead is raised, a weighted beam, movable relative to the cart carrier, contacts the lower bead of the tire and thus provides further support of the tire for rotation during spraying. Once the tire has been carried into the desired spraying position, spraying automatically commences for a predetermined period of time whereupon the tire is again lowered by the tire cart carrier and removed from the machine. The spraying environment of the apparatus is enclosed within a hood which is vented to remove excess cement from the work area. By positioning the weighted beam which contacts the lower bead of the tire at a particular distance away from the spray area in order to allow the tire of largest size to be supported, tires of all sizes will be supported along their upper and lower beads during movement of the tire cart carrier into the spraying position. The only manual labor required to operate the machine of the present invention is to load and unload the tire onto and from the tire cart carrier and initiate operation of the machine which is preferably accomplished by conventional electrical switches.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a longitudinal sectional view of the cement spraying machine of FIG. 1 taken generally along the line 2—2 of FIG. 1.

FIG. 3 is a top plan view of the cement spraying machine of FIG. 1.

DETAILED DESCRIPTION OF THE INVENTION

Figure 1:
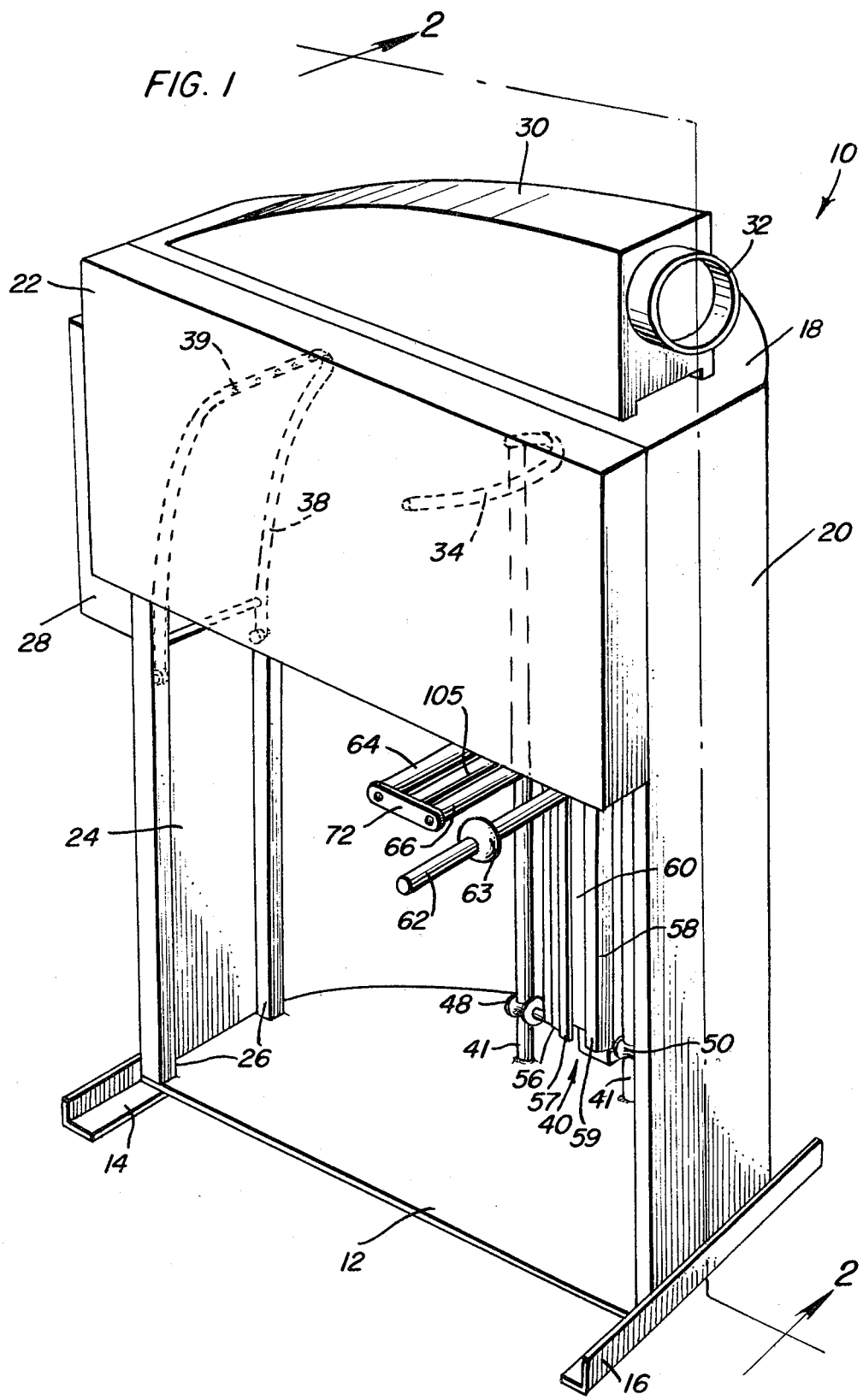
FIG. 1 is a perspective view of the cement spraying machine of the present invention in which the tire cleaning mechanism and spray mechanism are shown in phantom.

Referring to FIG. 1, the cement spraying machine of the present invention is generally indicated by reference numeral 10. Cement spraying machine 10 comprises bottom support 12 resting on a pair of foot bases 14 and 16, top support 18 and a non-removable cover 20 which forms the sides and rear surface of machine 10 between bottom support 12 and top support 18. Removable front cover 22 shields the work area from the spray heads during application of the cement onto the tire and can be removed for periodic cleaning and general maintenance of the spraying mechanism. The covering structure of cement spraying machine 10 is completed by end cover 24 which is fitted within a pair of side supports 26. An electrical switch panel 28 placed along the side of machine 10 is used to contain electrical components necessary to initiate operation.

Positioned and supported by top support 18 and communicating with the spray area is vent hood 30 including vent duct 32 which can be secured to a larger vent duct system for removing excess cement from the environment of the machine and workplace. Positioned within the tire treating area of machine 10 and screened from the workplace by means of removable cover 22 is arcuate spray head support 34 which supports a plurality of spray heads 36 (FIG. 3) and an air blower 38 secured to side supports 26 by means of bolts 27 (FIG. 4) capable of communicating with a source of pressurized air which exits through air holes 39 and contacts the surface of the buffed tire in order to remove loose rubber particles before the spraying operation commences. In order to move a tire into spraying position adjacent spray heads 36, cement spraying machine 10 includes a tire carrier assembly 40 which moves along a pair of spaced vertical slide rails 41.

Figure 4:
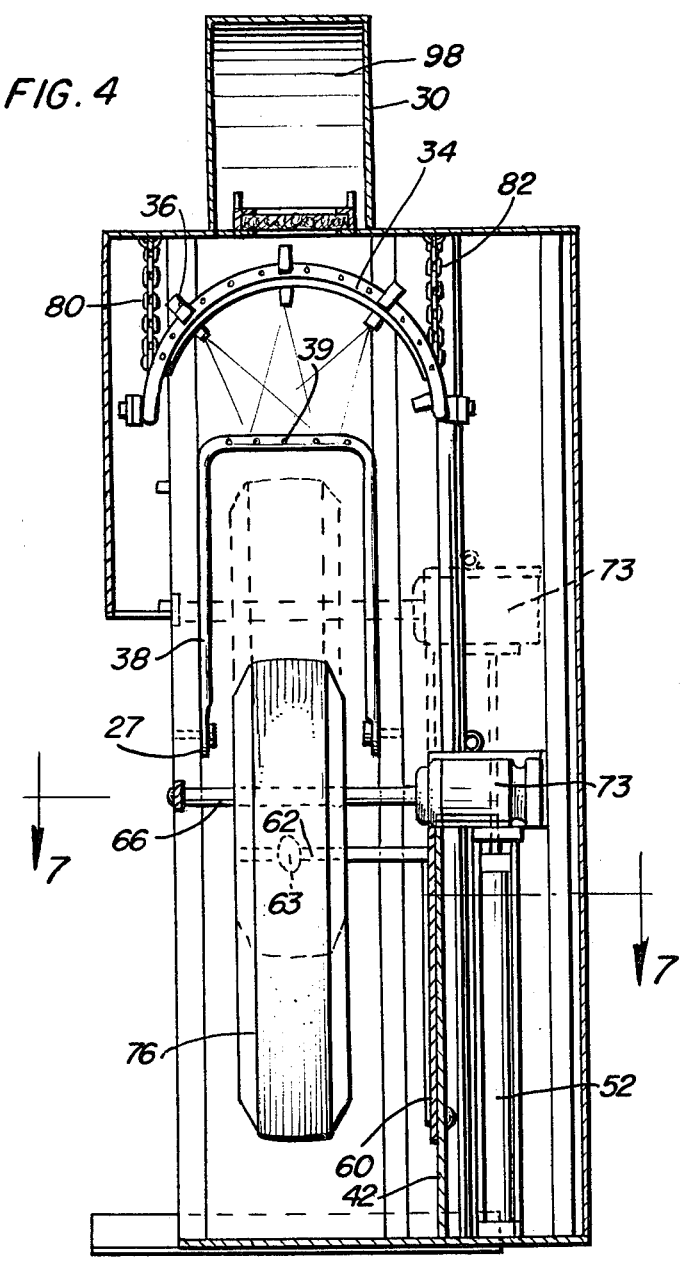
FIG. 4 is a longitudinal sectional view of the cement spraying machine of the present invention taken generally along the line 4—4 of FIG. 2.
Figure 5:
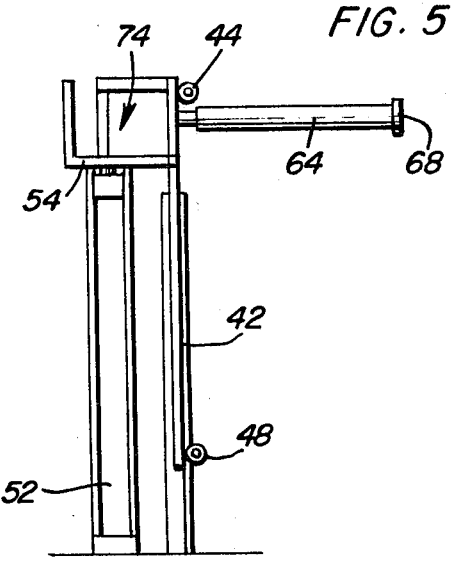
FIG. 5 is a side elevational view of the tire cart carrier which moves the tire into the spraying position.
Figure 6:
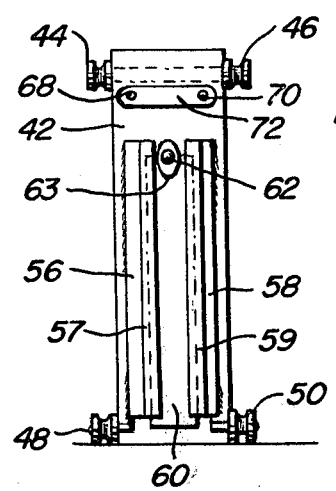
FIG. 6 is a front elevational view of the tire cart carrier.
Figure 7:
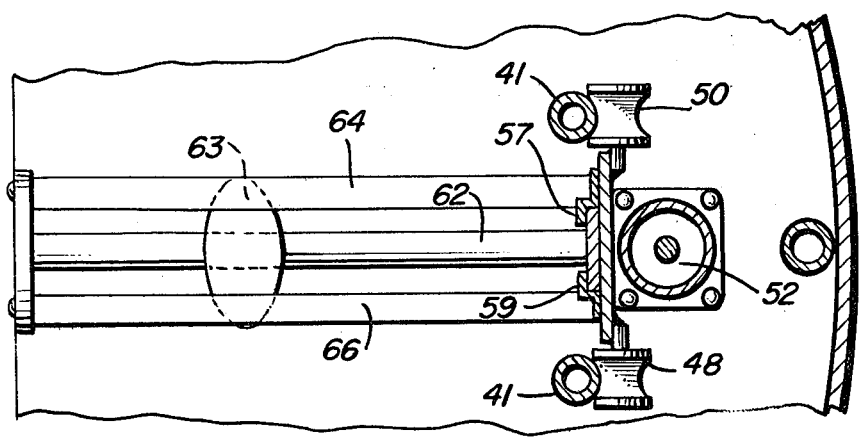
FIG. 7 is a transverse sectional view of the cement spraying machine of the present invention taken generally along the line 7—7 of FIG. 4.

Tire carrier assembly 40 is best illustrated in FIGS. 5 and 6. Tire carrier assembly 40 comprises a tire cart carrier frame 42 which has attached thereto a pair of top rollers 44 and 46 and a pair of bottom rollers 48 and 50. Rollers 44, 46, 48 and 50 contact and roll along one of the respective spaced slide rails 41. Positioned behind tire cart carrier frame 42 is vertically disposed hydraulic or pressurized air cylinder 52 which is associated with work plate 54 attached or integral with tire cart carrier frame 42. Accordingly, movement of the piston assembly (not shown) of cylinder 52 will move work plate 54 and initiate vertical movement of tire cart carrier frame 42. Permanently attached to the front face of tire cart carrier frame 42 are a pair of spaced lower guide rail holders 56 and 58. Rail holders 56 and 58 are secured to tire cart carrier frame 42 by welding, riveting, adhesives, or any permanent attaching means. A portion 57 and 59 of lower guide rail holders 56 and 58, respectively, is spaced from the surface of tire cart carrier frame 42 so as to permit the insertion of and relative movement of lower guide rail 60 with respect to tire cart carrier frame 42. Attached to lower guide rail 60 is centering beam 62 which moves with lower guide rail 60 and is contacted by the lower bead of the tire as the tire is being raised by tire cart carrier frame 42. The guide rail 60 provides means enabling automatic engagement with the lower bead portion of different sizes of tires by means limiting downward movement of said centering beam to a position adjacent the means engaging the upper bead portion of the tire when it is in its lowered position so that the tire bead will encircle said centering beam and the means engaging the upper bead portion of the tire when the tire is placed in the machine on the tire carrying means, said centering beam engaging the lower bead portion of the tire as it is lifted to the elevated position with gravity keeping said centering beam engaged with the lower bead portion of the tire when in its elevated position. The upper bead of the tire is supported by a pair of tire cart rollers 64 and 66 (see FIG. 7) onto which the tire is placed before initiating operation of machine 10 and before tire cart carrier frame 42 is raised by means of cylinder 52. Tire cart rollers 64 and 66 are journaled for rotation about bearings 68 and 70, respectively, which are mounted within bearing plate 72. Rollers 64 and 66 are rotated by means of a motor 73 (FIG. 4) positioned within motor mount and bore 74 (FIG. 5) of tire carrier assembly 40. By a conventional arrangement, the rotating work shaft of motor 73 is used to rotate tire cart rollers 64 and 66 within the bearings 68 and 70, respectively.

Referring now to FIGS. 3 and 4, it can be seen that spray head support 34 is shaped in the form of an arc to match the crown and side surfaces of tire 76 which is to be coated with a layer of cement. Spray heads 36 are mounted to arcuate spray head support 34 by means of attachment screws, bolts and the like placed through mounting holes spaced along the entire length of spray head support 34. As can be determined, the number as well as the arrangement of spray heads 36 disposed along spray head support 34 can be varied by simply attaching spray heads 36 to support 34 by placing any conventional attachment means through the desired mounting holes. Referring also to FIG. 2, arcuate spray head support 34 is supported in the spraying position by means of a pair of chains 80 and 82 which are attached to the interior surface of top support 18. Further, arm assemblies 84 and 86 also support arcuate spray head support 34 away from the walls of machine 10 and in the spraying position. The angle at which spray heads 36 direct the spray of cement onto tire 76 can be adjusted by shortening or lengthening each of chains 80 and 82 and/or by adjusting each of arm assemblies 84 and 86. As shown in FIGS. 2 and 3, arm assemblies 84 and 86 are formed from a pair of overlapping arm brackets 88 and 90 which are secured to spray head support 36 and non-removable cover 20, respectively. Arm brackets 88 and 90 are movable relative to one another through slot 92 which allows the passage of the locking bolt 94. As can be seen in FIG. 2, moving brackets 88 and 90 relative to one another adjusts the angle at which spray head support 34 is pitched about the axis passing through the attachment points of arm bracket 88 and the respective chains 80 and 82 to support 34.

As can best be seen in FIGS. 2 and 4, filter vent hood 30 is a hollow member placed over and supported on top support 18 of cement spraying machine 10. A portion of top support 18 is cut out as indicated by reference numeral 96 so as to provide communication between the interior of filter vent hood 30 as indicated by reference numeral 98 and the environment adjacent spray heads 36. Vent filter hood 30 includes a filter 100 disposed between the interior of machine 10 and the interior 98 of vent filter hood 30. Vent duct 32 can be attached to a separate ducting system which may form part of the ventilation system of the plant or some further duct work so as to insure that material such as excess cement as well as loose rubber particles removed prior to spraying are transferred from the work area, thus providing a clean and safe work area far different from the polluted and hazardous work areas which resulted during the use of prior art cement spraying machines which sprayed the tires in the open without adequate ventilation of the workplace.

Operation of cement spraying machine 10 for applying a uniform layer of cement on a tire for the purpose of recapping the tire can be best explained when referring to FIGS. 1, 2 and 4. During the recapping process, the worn tire is buffed so as to remove all portions of the remaining tread and to provide a surface which will accept the layer of cement and the new tread to be bonded thereto. Once the tire has been buffed and substantially all of the loose rubber has been removed, the tire is ready for the application of the cement coating. Accordingly, after the tire has been buffed and cleaned of rubber particles, the tire is manually transferred from the buffing machine and placed within cement spraying machine 10 of the present invention by placing the tire, such as tire 76, so that upper bead 102 of tire 76 is placed over and in contact with tire cart rollers 64 and 66. A rod 105 positioned between tire cart rollers 64 and 66 holds bearing support 72 in place. Once tire 76 has been placed over tire cart rollers 64 and 66, the remaining operation of the machine is accomplished automatically without the need of further manual labor except for the moving of the appropriate switches on switch panel 28 and the removal of the tire from tire cart rollers 64 and 66 after the completion of the spraying operation. Switch panel 28 can include electronic circuitry which automatically sets the duration of time at which cement is sprayed onto the rotating tire. Since machine 10 will accept tires of varying diameter, it is important that the amount of cement coating applied to the tires be controlled by controlling the time of spraying or even the speed at which the tire is rotated to compensate for the varying tire sizes. Once tire 76 has been placed over tire cart rollers 64 and 66 such that upper bead 102 is in contact with rollers 64 and 66, operation of machine 10 is initiated by an electronic switching means (not shown) contained within switch panel 28. Upon start up, cylinder 52 is activated thereby pushing upward work plate 54 and attached tier cart carrier frame 42 which is guided by means of rollers 44, 46, 48 and 50 moving in contact upward along the pair of spaced slide rails 41. As tire 76 is raised, lower bead 104 of tire 76 will contact centering beam 62 which is weighted by means of weight 63. Further movement of tire 76 by the upward movement of tire cart carrier frame 42 begins to pull centering beam 62 and lower guide rail assembly 60 upward relative to rail holders 56 and 58 as lower bed 104 is urged against centering beam 62. Tire cart carrier frame 42 continues to be pushed upward by cylinder 52 until tire 76 is in the desired spraying position adjacent spray heads 36. Further upward movement of tire cart carrier frame 42 can be stopped by means of electrical circuitry included within switch box 28, although it is preferred to include a mechanical trip device positioned on tire cart carrier frame 42 in which the trip device will trip a switch to stop the upward movement once tire cart carrier frame 42 is in the desired spraying position. As can be determined, tire carrier assembly 40 can accommodate all tire sizes without any manual adjustment of machine 10. As long as centering beam 62 is positioned relative to the spraying area at a sufficient distance so as to enable the lower bead of a tire of any size to contact centering beam 62 before tire cart carrier frame 42 is lifted to the desired spraying position, all tires can be sprayed uniformly by machine 10. Once tire 76 has been raised to the desired spraying position, motor 73 is automatically activated causing the rotation of tire cart rollers 64 and 66. The contact of tire cart rollers 64 and 66 against upper bead 102 of tire 76 and the contact of centering beam 62 on lower bead 104 allows the tire to be rotated and yet remain centered on the pair of tire cart rollers 64 and 66 without lateral movement. Accordingly, centering beam 62 maintains the rotation of tire 76 uniform and thereby allows the uniform application of the cement coating. Once tire 76 is rotated, air from air blower 38 is blown against the surface of tire 76 removing any loose rubber particles which may still remain after the buffing operation. After a predetermined period of time, the air cleaning operation is stopped and the cement is applied from spray heads 36 which due to the arcuate configuration of spray head support 34 and the spaced locations of spray heads 36 along spray head support 34 provide a uniform coating over the entire exterior surface of tire 76. During the spraying operation, vent filter hood 30 removes all excess cement and cement fumes from the spray area and vents such excess cement through vent duct 32 and into the ventilation system of the plant, thus maintaining the work area free of cement fumes which previously posed a considerable health and safety hazard. After a preset time period, spraying is stopped. At this point, the tire can be continually rotated to initiate drying of the cement coating. After spraying, and optionally after the completion of drying, cylinder 52 is again activated to lower tire cart carrier frame 42 and supported tire 76 to the unloading position. Lowering of tire cart carrier frame 42 causes bead 104 to eventually separate from centering beam 62 whereupon once tire cart carrier frame 42 in the lowermost position, tire 76 can be removed from tire cart rollers 64 and 66 by hand and continued through the recapping process.

As can be seen, the only manual labor required to provide a uniform application of cement on tires by the cement spraying machine of the present invention is simply loading and unloading the tire from the tire carrier assembly 40. The particular electric circuitry used to initiate movements of tire carrier assembly 40 is not part of the present invention, although such circuitry is considered to be well-known to those skilled in control operations. Accordingly, many variations of circuitry can be used to initiate the movements of the various components of machine 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A machine for applying a coating of cement to the exterior surface of a tire preparatory to recapping the tire comprising a generally vertically disposed cover defined by a top support and depending front, side and end covers having an opening in a lower portion thereof to enable insertion and removal of tires, said cover including vent means communicating with the interior of the upper portion of the cover for exhausting material from the cover, tire carrier means in said cover for movement between a tire loading and discharging lowered position and a cement applying elevated position and means in said cover above the opening for applying cement to the exterior surface of the tire when in elevated position so that cement fumes will be exhausted from the cover through the vent means.

2. The machine as defined in claim 1 wherein said tire carrier means includes means engaging the upper bead portion of a tire to support the tire, said supporting means includes means to rotate the tire, and means engaging the lower bead portion of the tire to center the tire and stabilize it during rotation, said centering means being attached to means enabling automatic engagement with the lower bead portion of different sizes of tires.

3. The machine as defined in claim 2 wherein said centering means includes a centering beam insertable within the bead of a tire, said means attached to the centering means including a lower guide rail which enables free upward movement of said centering beam with gravity urging said centering beam toward a lower position, said lower guide rail including means limiting downward movement of said centering beam to a position adjacent the means engaging the upper bead portion of the tire when it is in its lowered position so that the tire bead will encircle said centering beam and the means engaging the upper bead portion of the tire when the tire is placed in the machine on the tire carrier means, said centering beam engaging the lower bead portion of the tire as it is lifted to the elevated position with gravity keeping said centering beam engaged with the lower bead portion of the tire when in its elevated position.

4. The machine as defined in claim 3 wherein said means engaging the upper bead portion of the tire includes a pair of parallel, spaced rollers, means driving said rollers, means raising and lowering said rollers between lowered and elevated positions with the rollers being positioned below an upper edge of the opening in the cover when in lowered position to enable a tire to be placed on the rollers and said centering beam and the upper portion of the tire being elevated above said upper edge of the opening when in elevated position.

5. The machine as defined in claim 4 wherein said means attached to said centering beam include a guide rail on one end of said centering beam, said guide rail being vertically oriented, a portion of vertical guide rail holders receiving said guide rail, said guide rail holders being mounted on a frame with the rollers for movement therewith.

6. The machine as defined in claim 1 wherein said cover includes an air blower above the opening with air being directed toward the tire to clean the tire before application of cement with material removed from the tire being exhausted out through the vent means.

* * * * *